United States Patent
Foroughi

(10) Patent No.: US 10,740,644 B2
(45) Date of Patent: Aug. 11, 2020

(54) METHOD AND SYSTEM FOR BACKGROUND REMOVAL FROM DOCUMENTS

(71) Applicant: Intuit Inc., Mountain view, CA (US)

(72) Inventor: Homa Foroughi, Edmonton (CA)

(73) Assignee: Intuit Inc., Mountain View, CA (US)

( * ) Notice: Subject to any disclaimer, the term of this patent is extended or adjusted under 35 U.S.C. 154(b) by 255 days.

(21) Appl. No.: 15/907,282

(22) Filed: Feb. 27, 2018

(65) Prior Publication Data

US 2019/0266433 A1 Aug. 29, 2019

(51) Int. Cl.
| | | |
|---|---|---|
| *G06K 9/00* | (2006.01) | |
| *G06K 9/32* | (2006.01) | |
| *G06T 7/194* | (2017.01) | |
| *G06K 9/34* | (2006.01) | |
| *G06K 9/58* | (2006.01) | |
| *G06K 9/46* | (2006.01) | |
| *G06K 9/62* | (2006.01) | |
| *G06K 9/20* | (2006.01) | |

(52) U.S. Cl.
CPC .......... *G06K 9/346* (2013.01); *G06K 9/4642* (2013.01); *G06K 9/4652* (2013.01); *G06K 9/58* (2013.01); *G06K 9/6212* (2013.01); *G06T 7/194* (2017.01); *G06K 9/00463* (2013.01); *G06K 2009/2045* (2013.01); *G06T 2207/20132* (2013.01)

(58) Field of Classification Search
CPC .......... G06K 9/00449; G06K 9/00671; G06K 9/3233; G06K 9/346; G06K 9/4642; G06K 9/4647; G06K 9/4652; G06K 9/58; G06K 9/6212; G06K 2009/2045; G06K 9/00463; G06T 2207/20132
See application file for complete search history.

(56) References Cited

U.S. PATENT DOCUMENTS

| | | | | |
|---|---|---|---|---|
| 5,268,967 A | * | 12/1993 | Jang ................... | G06T 7/0012 382/132 |
| 6,024,018 A | * | 2/2000 | Darel ................... | B41F 33/0036 101/365 |
| 2001/0043742 A1 | * | 11/2001 | Melen ................ | G06K 9/00442 382/203 |

(Continued)

OTHER PUBLICATIONS

Chou et al. ("Content-Based cropping using visual saliency and blur detection," 10th International Conference on Ubi-media Computing and Workshops, Aug. 1-4, 2017) (Year: 2017).*

(Continued)

*Primary Examiner* — Yubin Hung
(74) *Attorney, Agent, or Firm* — Ferguson Braswell Fraser Kubasta PC

(57) ABSTRACT

The invention relates to a method for background removal from documents. The method includes obtaining an image of a document, performing a clustering operation on the image to obtain a plurality of image segments, and performing, for each image segment, a foreground/background classification to determine whether the image segment includes foreground. The method further includes obtaining an augmented image by combining the image segments that include foreground, and obtaining a background-treated image by cropping the image of the document, based on the foreground in the augmented image.

20 Claims, 16 Drawing Sheets

(9 of 16 Drawing Sheet(s) Filed in Color)

(56) References Cited

U.S. PATENT DOCUMENTS

| | | | | |
|---|---|---|---|---|
| 2004/0096102 A1* | 5/2004 | Handley | ............ | G06K 9/00456 382/164 |
| 2006/0147096 A1* | 7/2006 | Lee | .................... | G06K 9/00067 382/124 |
| 2006/0290950 A1* | 12/2006 | Platt | ...................... | G06T 3/4053 358/1.2 |
| 2007/0070201 A1* | 3/2007 | Yokomitsu | .............. | G06T 7/246 348/169 |
| 2008/0175476 A1* | 7/2008 | Ohk | .................... | G06K 9/00456 382/176 |
| 2009/0185752 A1* | 7/2009 | Dwivedula | .......... | G06K 9/3233 382/256 |
| 2010/0157340 A1* | 6/2010 | Chen | .................. | G06K 9/00456 358/1.9 |
| 2010/0183225 A1* | 7/2010 | Vantaram | .................. | G06T 7/11 382/173 |
| 2010/0199227 A1* | 8/2010 | Xiao | ...................... | G06F 3/0481 715/863 |
| 2010/0271646 A1* | 10/2010 | Morimoto | .......... | G03G 15/5025 358/1.9 |
| 2010/0303360 A1* | 12/2010 | Matsuda | .............. | H04N 1/3871 382/195 |
| 2010/0329551 A1* | 12/2010 | Yamazaki | .............. | G06K 9/342 382/165 |
| 2011/0158517 A1* | 6/2011 | Dai | .......................... | G06K 9/32 382/165 |
| 2014/0003718 A1* | 1/2014 | Eid | ......................... | G06T 11/60 382/170 |

OTHER PUBLICATIONS

Yao et al. ("Combining randomization and discrimination for fine-grained image categorization," CVPR, Jun. 20-25, 2011) (Year: 2011).*

Sarkar et al. ("Classifying Foreground Pixels in Document Images," 10th International Conference on Document Analysis and Recognition, Jul. 26-29, 2009) (Year: 2009).*

Cheheb et al. ("Random sampling for patch-based face recognition," 5th International Workshop on Biometrics and Forensics, Apr. 4-5, 2017) (Year: 2017).*

* cited by examiner

Original Image 700

Image Segments (k = 6) 710A-710F

Zero-Masked Pixels 714

Clustered Pixels 712

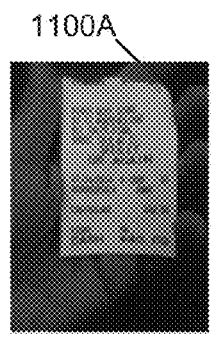 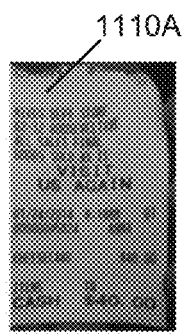 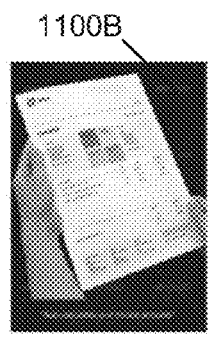 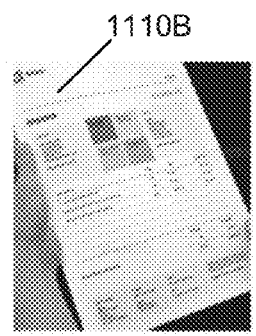
FIG. 11A          FIG. 11B
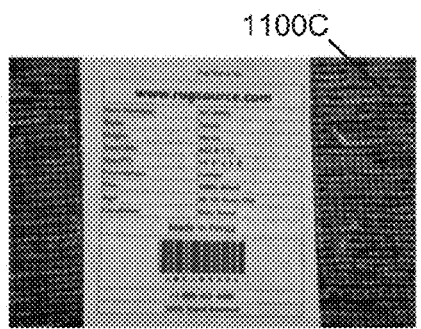 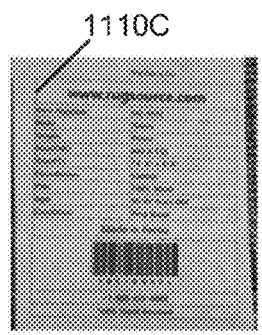
FIG. 11C
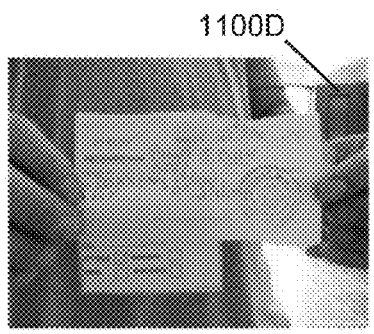 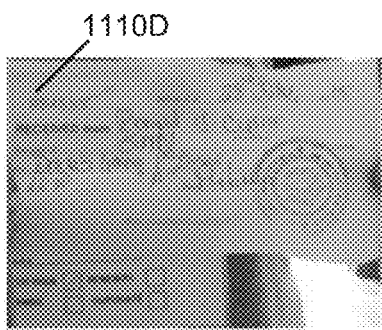
FIG. 11D
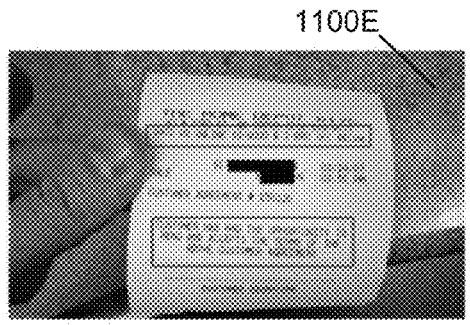 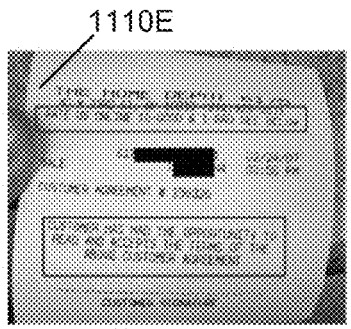
FIG. 11E

METHOD AND SYSTEM FOR BACKGROUND REMOVAL FROM DOCUMENTS

BACKGROUND

Paper-based documents such as forms are frequently digitized using digital cameras. The digitized document may then be further processed, e.g., using optical character recognition. When a paper-based document is photographed, a background surrounding the document may be captured by the digital camera, in addition to the document itself. Such a background may complicate further processing.

SUMMARY

In general, in one aspect, one or more embodiments relate to a method for background removal from documents, comprising obtaining an image of a document; performing a clustering operation on the image to obtain a plurality of image segments; performing, for each image segment, a foreground/background classification to determine whether the image segment comprises foreground; obtaining an augmented image by combining the image segments comprising foreground; and obtaining a background-treated image by cropping the image of the document, based on the foreground in the augmented image.

In general, in one aspect, one or more embodiments relate to a system for background removal from documents, the system comprising a computer processor and a pixel clustering engine executing on the computer processor configured to perform a clustering operation on an image of a document to obtain a plurality of image segments. The system further comprises a foreground/background segmentation engine executing on the computer processor configured to perform, for each image segment, a foreground/background classification to determine whether the image segment comprises foreground, and obtain an augmented image by combining the image segments that comprise foreground. The system also comprises a cropping engine executing on the computer processor configured to obtain a background-treated image by cropping the image of the document, based on the foreground in the augmented image.

In general, in one aspect, one or more embodiments relate to a non-transitory computer readable medium including computer readable program code for causing a computer system to obtain an image of a document; perform a clustering operation on the image to obtain a plurality of image segments; perform, for each image segment, a foreground/background classification to determine whether the image segment comprises foreground; obtain an augmented image by combining the image segments comprising foreground; and obtain a background-treated image by cropping the image of the document, based on the foreground in the augmented image.

Other aspects of the invention will be apparent from the following description and the appended claims.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIGS. 7A, 7B, 7C, 8A, 8B, 9A, 9B, 9C, 9D, 9E, 9F, 9G, 9H, 10A, 10B, 11A, 11B, 11C, 11D and 11E show examples in accordance with one or more embodiments of the invention.

DETAILED DESCRIPTION

Figure 1:
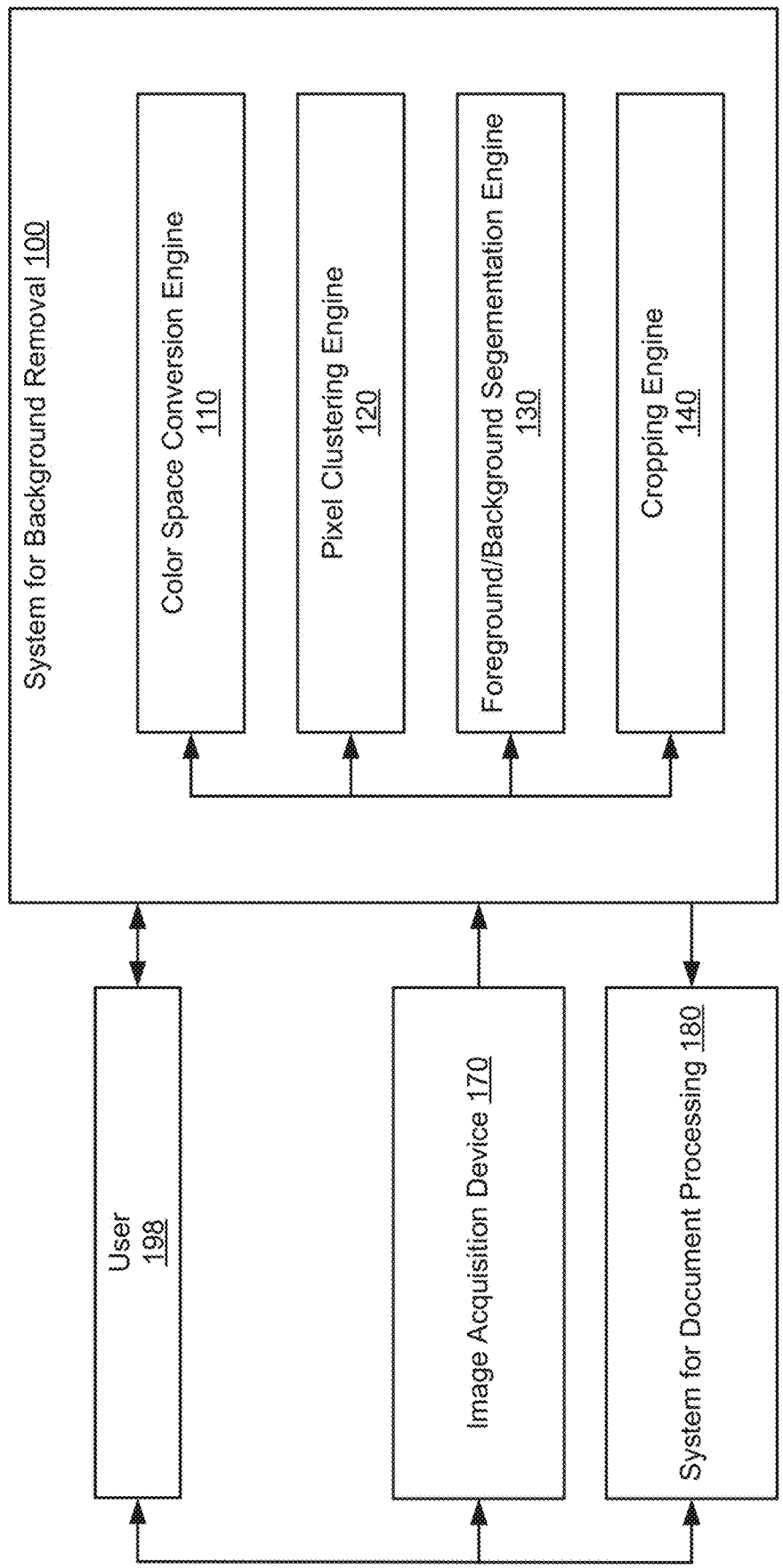
FIG. 1 shows a system for background removal in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the invention, the various disclosed embodiments may be combined in virtually any manner. All combinations are contemplated herein.

In general, embodiments of the invention provide a method and a system for background removal from documents. Paper-based documents such as forms are frequently digitized using digital cameras. The digitized document may then be further processed, e.g., using optical character recognition. When a paper-based document is photographed, a background surrounding the document may be captured by the digital camera. This background may complicate further processing. Background removal may, thus, facilitate further processing.

Turning to FIG. 1, a system for background removal from documents, in accordance with one or more embodiments of the invention, is shown. The system (100) may be accessed by a user (198) and may interface with an image acquisition device (170) and a system for document processing (180).

In one or more embodiments of the invention, an image of a document (subsequently described with reference to FIG. 2) is provided by the user (198). The user may provide the image using an image acquisition device (170) such as a digital camera (e.g., using the camera of a cell phone). Alternatively, the user may select a previously captured image from an image library (not shown). The image is provided to the system for background removal (100), which preprocesses the image to reduce or eliminate a background in the image. The preprocessed image may subsequently be submitted to a system for document processing (180), which may, for example, identify and extract content of the document.

The system for background removal (100) may include a color space conversion engine (110), a pixel clustering engine (120), a foreground/background segmentation engine and a cropping engine (140). Each of these components is described below.

The color space conversion engine (110), in accordance with one or more embodiments of the invention, includes a set of machine-readable instructions (stored on a computer-readable medium) which, when executed by the system (100), convert the provided image of the document to a color space that is suitable for performing subsequently described operations. Such a color space may be, for example, the hue-saturation-value (HSV) color space and/or the Lab color space which uses lightness and color dimensions to encode the appearance of a pixel, as further discussed with reference to FIG. 3.

The pixel clustering engine (120), in accordance with one or more embodiments of the invention, includes a set of machine-readable instructions (stored on a computer-readable medium) which, when executed by the system (100), clusters pixels of the image based on, for example, color. A detailed description of the operations performed by the pixel clustering engine (120) is provided in the flowchart of FIG. 3.

The foreground/background segmentation engine (130), in accordance with one or more embodiments of the invention, includes a set of machine-readable instructions (stored on a computer-readable medium) which, when executed by the system (100), identifies the clusters of pixels as either foreground or background. Based on this identification, the foreground/background segmentation engine may separate the foreground, i.e., elements of the document, from the background. A detailed description of the operations performed by the foreground/background segmentation engine (130) is provided in the flowchart of FIG. 3.

The cropping engine (140), in accordance with one or more embodiments of the invention, includes a set of machine-readable instructions (stored on a computer-readable medium) which, when executed by the system (100), further isolates the foreground from the background, by removing sections from the foreground that are considered non-foreground. A detailed description of the operations performed by the cropping engine (140) is provided in the flowchart of FIG. 3.

In addition to the shown components, the system for background removal may include additional components, e.g., a user interface (not shown). The user interface may enable the user (198) to select an image to be submitted to the system for background removal (100). The user interface may further provide the user with a result of the background removal, e.g., by displaying the image, after the background removal to the user. The user interface may optionally further enable the user to adjust the resulting image, for example by adjusting the cropping as it may have been performed using the methods described below.

Figure 12A:
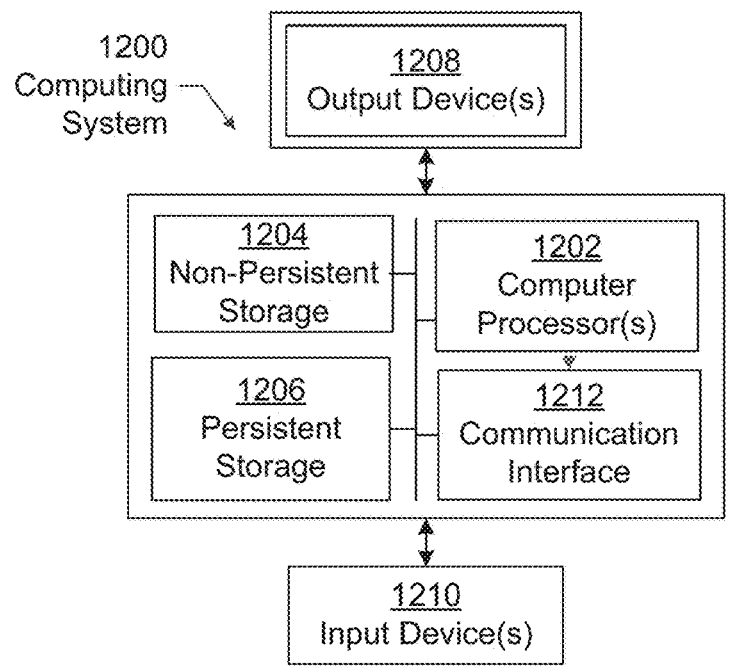
FIGS. 12A and 12B show computing systems in accordance with one or more embodiments of the invention.
Figure 12B:
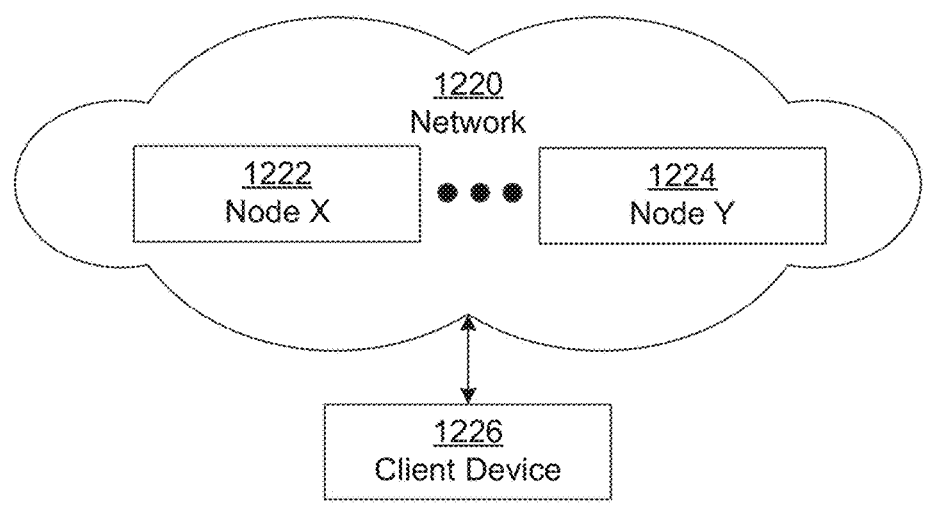

Embodiments of the invention may be implemented on one or more computing systems that may be similar to the computing system introduced in FIGS. 12A and 12B. While FIG. 1 shows a configuration of components, other configurations may be used without departing from the scope of the invention. For example, various components may be combined to create a single component. As another example, the functionality performed by a single component may be performed by two or more components that may be communicatively connected using a network connection. A system, in accordance with one or more embodiments of the invention, may further be distributed. For example, an image may be captured by the user with a cell-phone camera. A user interface executing on the cell-phone may serve as a front-end enabling the user to submit the image for pre-processing to a back-end service that may execute on a remote server, e.g., in a cloud-based system. Network connections may further be used to connect various components, such as the system for background removal (100), the image acquisition device (170) and/or the system for document processing (180).

Figure 2:
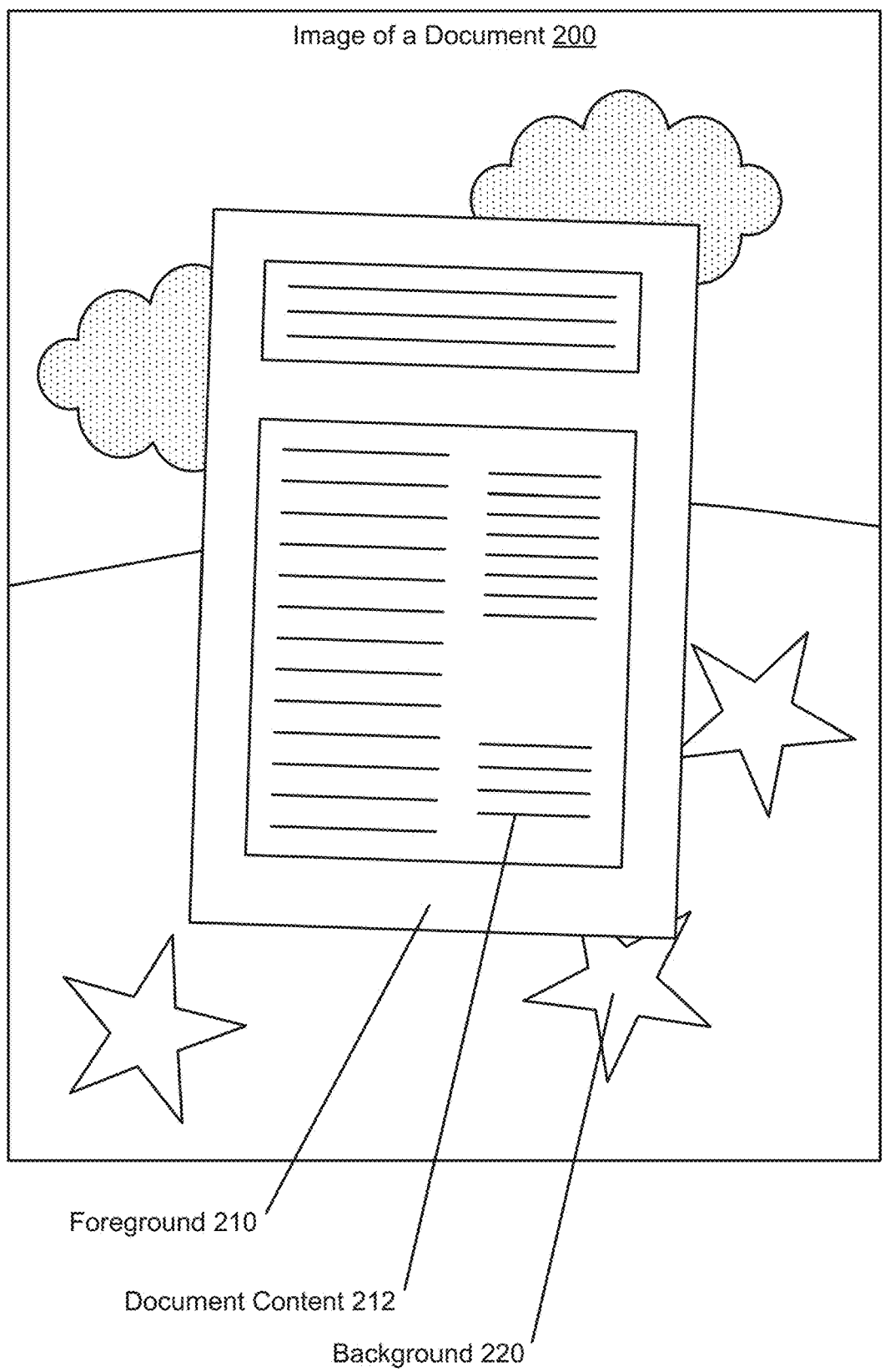
FIG. 2 shows an exemplary image of a document in accordance with one or more embodiments of the invention.

Turning to FIG. 2, an exemplary image of a document, in accordance with one or more embodiments of the invention, is schematically shown. The document may be any kind of document, that includes a document content such a text, graphs, tables, etc. In one or more embodiments of the invention, the document is a form that a user intends to submit for further processing. Rather than manually entering the content of the document via a user interface, the user, in accordance with an embodiment of the invention, obtains an image of the document (200) from which the content is to be extracted, e.g., using optical character recognition. The document may be, for example, a tax form, a check, a contract, a real-estate purchasing contract, a receipt, an invoice, etc. In one or more embodiments of the invention, the image of the document (200) includes a foreground (210) and a background (220). The foreground (210) represents the image of the actual document that the user is capturing, whereas the background (220) is an image of the surroundings of the document. For example, the background may be a wall, the surface of a table, a sheet, cardboard, or anything else depending on where the user placed the document when imaging the document. The presence of this background may complicate the extraction of the document content (212) from the foreground (210). Embodiments of the invention reduce or eliminate the background (220) surrounding the foreground (210). The image of the document (200) may be provided in any type of compressed or uncompressed image format, e.g., as a jpg, gif, tif, bmp file. Alternatively, the image may be embedded in a file of a different format, e.g., in a pdf document.

FIGS. 3, 4, 5 and 6 show flowcharts in accordance with one or more embodiments of the invention. While the various steps in these flowcharts are provided and described sequentially, one of ordinary skill will appreciate that some or all the steps may be executed in different orders, may be combined or omitted, and some or all the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 3:
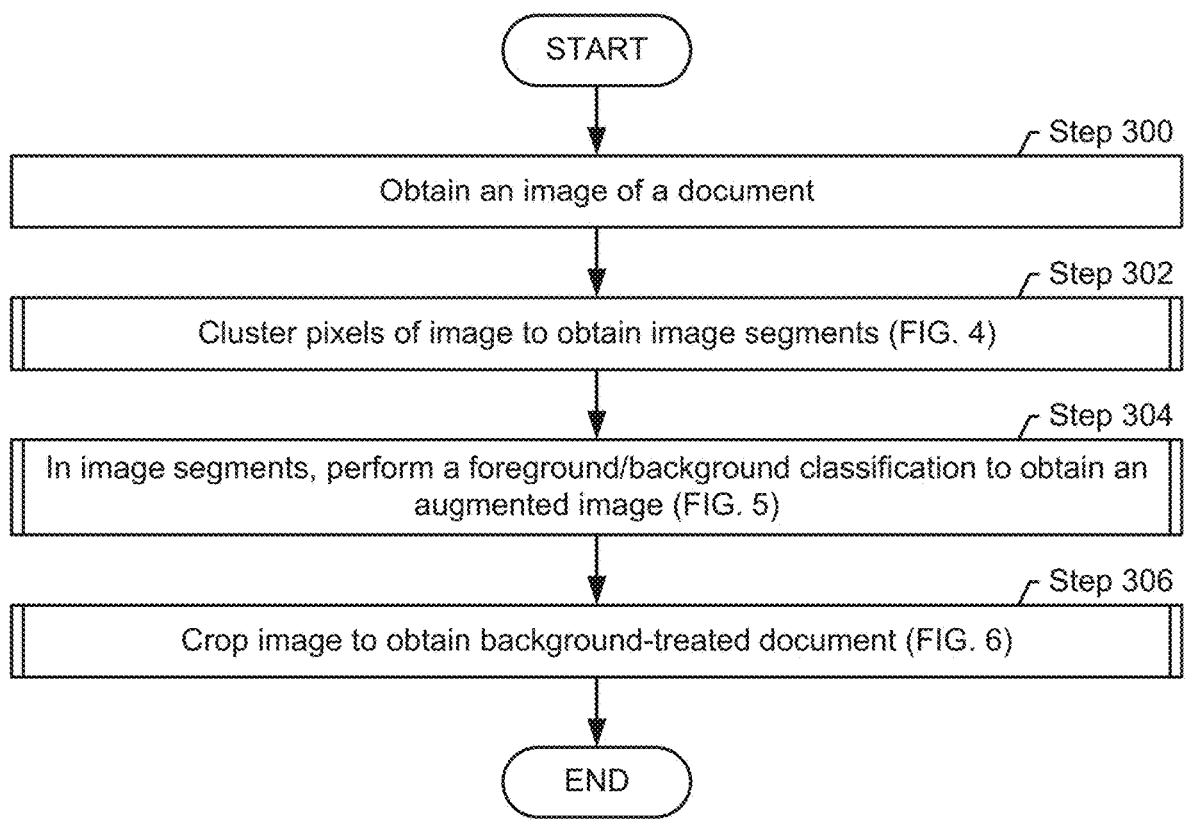
FIGS. 3, 4, 5 and 6 show flowcharts in accordance with one or more embodiments of the invention.

Turning to FIG. 3, a method for background removal from documents is shown. The method may be executed on an image of a document selected or provided by the user. The execution of the method may be invoked by the user submitting an image or by a process requesting an image. The method includes a first operation that removes background using clustering methods, and a second operation that removes background using cropping methods. These operations involve various steps such as conversions to different color spaces, image segmentations, foreground/background classifications, etc., that are subsequently described. Steps of the method are described with reference to the exemplary illustrations shown in FIGS. 7A, 7B, 7C, 8A, 8B, 9A, 9B, 9C, 9D, 9E, 9F, 9G and 9H.

In Step 300, an image of a document is obtained. The image of the document may be obtained using a digital camera, any other imaging device, or from a repository of archived images of documents.

In Step 302, the pixels of the image are clustered to obtain image segments. A number, k, of image segments may be obtained based on a clustering operation that establishes k clusters. The details of Step 302 are provided in FIG. 4.

In Step 304, a foreground/background classification is performed for each image segment. Based on the foreground/background classification, a determination is made about whether the clustered pixels in the image segment are to be considered foreground or background. If an image segment is found to include a sufficient degree of foreground, the image segment may be considered a foreground. If multiple image segments are found to contain foreground, these images segments may all be treated as foreground by combining the associated clustered pixels into a single foreground. The details of Step 304 are provided in FIG. 5.

In Step 306, the image is cropped to remove background from the image, based on the previously performed foreground/background classification. The details of Step 306 are provided in FIG. 6.

The resulting foreground image includes the document content, while significantly reducing or eliminating the surrounding background, in accordance with one or more embodiments of the invention. The foreground image may be further processed to extract data, e.g., using an optical character recognition operation.

Figure 4:
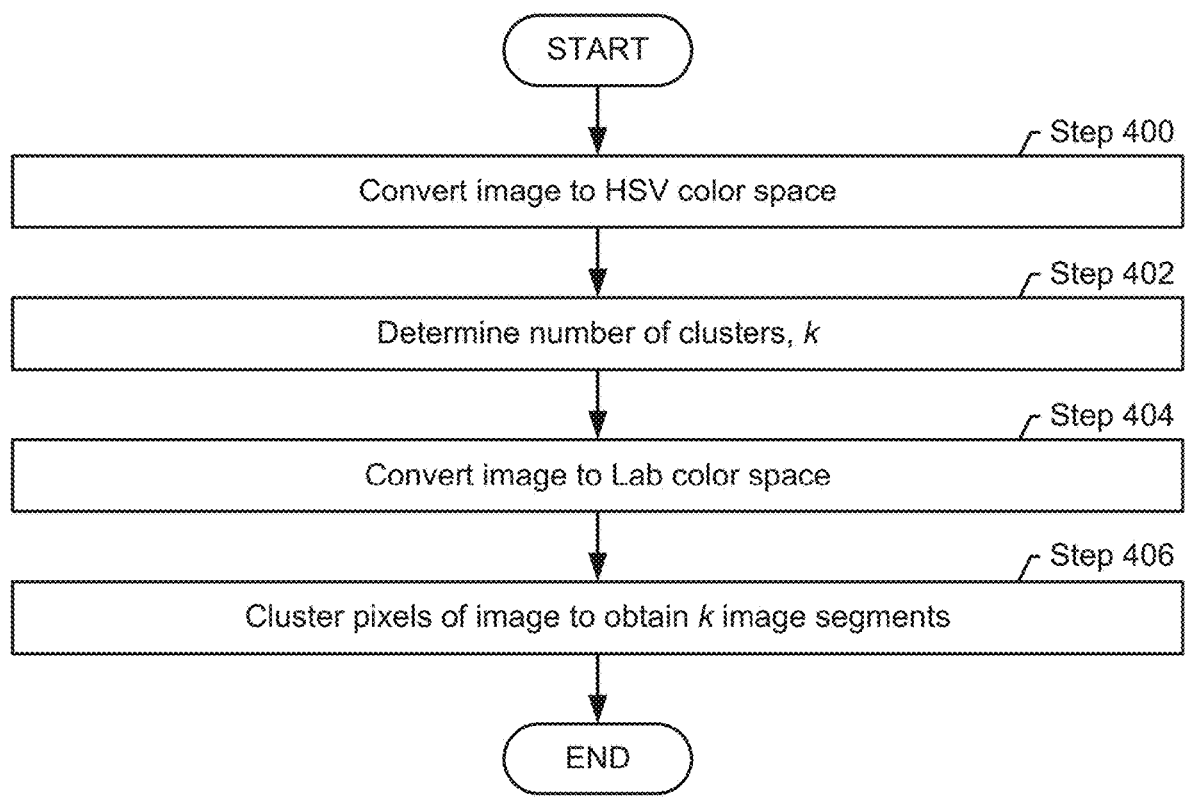

Turning to FIG. 4, a method for clustering pixels of an image to obtain image segments is described. Examples of the operations performed in Steps 400-406 are provided in FIGS. 7A, 7B, 8A and 8B.

In Step 400, the image is converted to a color space that enables separation of luminance and chromaticity. Assume, for example, that the image is provided in RGB format. A transformation may be performed, for example, to the HSV (hue, saturation, value) color space or to an alternative color space such as HSL (hue, saturation, lightness). In HSV color space, each pixel in the image is encoded by a hue component (describing the color), a saturation component (describing the intensity of the color, i.e., how much black, white or gray is added to the color), and a value component (describing the shade or brightness). Accordingly, unlike in the original RGB format, hue, saturation and lightness may be directly and separately accessible.

In Step 402, a number of clusters, k, to be obtained in a subsequently performed clustering operation, is determined. In one embodiment of the invention, k is determined based on a histogram of the hue component in the HSV color space. More specifically, the hue component histogram enables an assessment of the color distribution in the image, and k may correspond to the major color components appearing as peaks in the hue component histogram.

In Step 404, the image is converted to a color space that enables separation of luminance and chromaticity. Assume, again, that the image is provided in RGB format. In one embodiment of the invention, a transformation is performed to the Lab (lightness, color component a, color component b) color space. Unlike in the original RGB format, the color components are separated from the lightness, thus making them directly accessible for the clustering operation of Step 406.

Figure 7A:
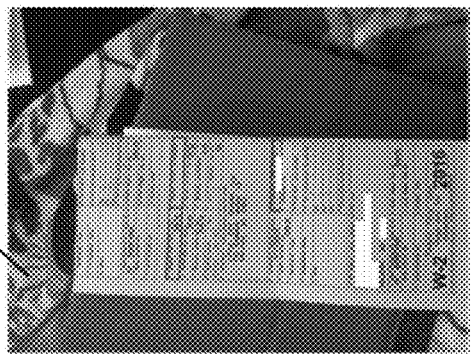
Figure 7B:
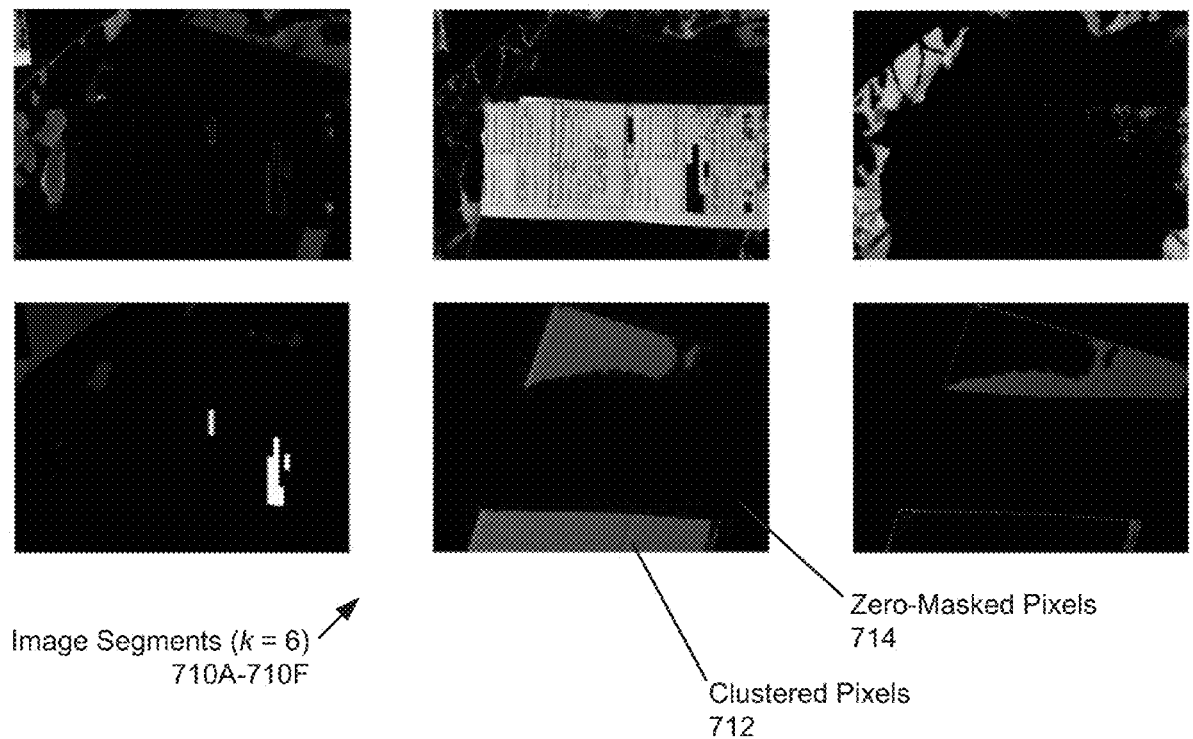
Figure 8A:
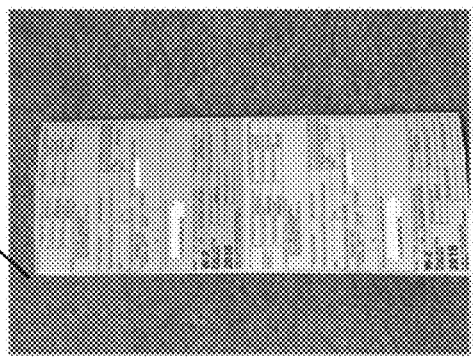

In Step 406, the pixels of the image are clustered to obtain k image segments. In one embodiment of the invention, the clustering is performed based on pixel color, i.e., based on the ab channels of the Lab color representation obtained in Step 404. A k-means clustering algorithm may be chosen to assign the pixels of the image to k clusters. Those skilled in the art will appreciate that other classifications algorithms may be used, without departing from the invention.

k image segments may be generated based on the clustering operation, with one image segment being generated per cluster. Accordingly, each resulting image segment may show the pixels that are associated with the corresponding cluster. Other pixels, i.e., those pixels that do not belong to the cluster associated with the image segment are zero-masked, in accordance with an embodiment of the invention. Each image segment may be sized identically to the original image. Examples of the operations performed in Step 404 are provided in FIGS. 7B and 8B. FIGS. 7A and 8A show the original image (700, 800) which, in both examples, are segmented into k=6 clusters, thereby generating six image segments (710A-710F, 810A-810F). Each image segment includes the clustered pixels (712, 812) and may further include zero-masked pixels (714, 814).

Figure 5:
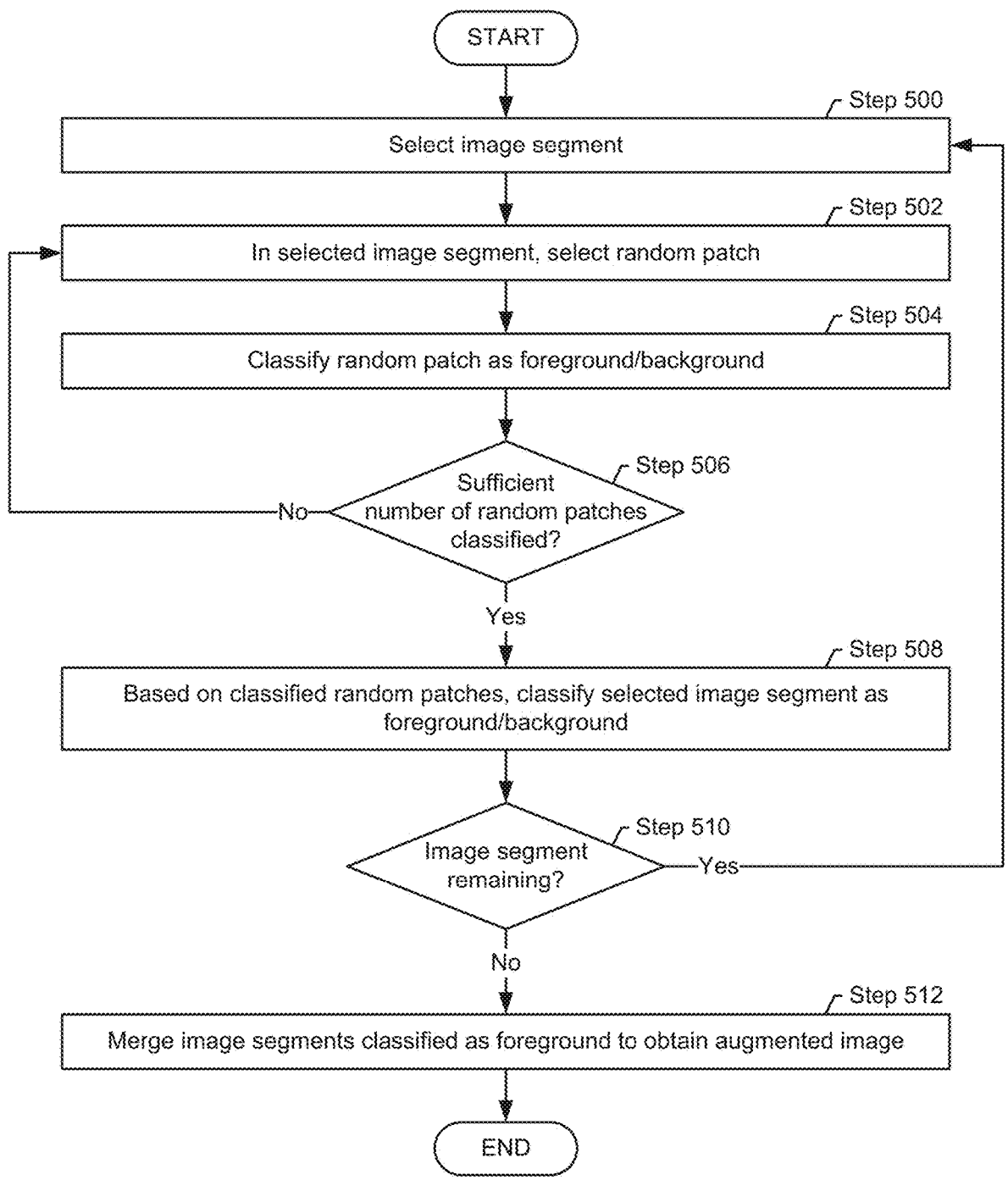

Turning to FIG. 5, a method for performing a foreground/background classification is described. An example of the operations performed in Steps 500-512 is provided in FIG. 7C. The exemplary image segments shown in FIG. 7C correspond to a selection of the image segments shown in FIG. 7B.

In Step 500, an image segment is selected for the subsequently performed foreground/background classification. Referring to the previously introduced example, one of the six image segments (710A-710F) is selected.

Figure 7C:
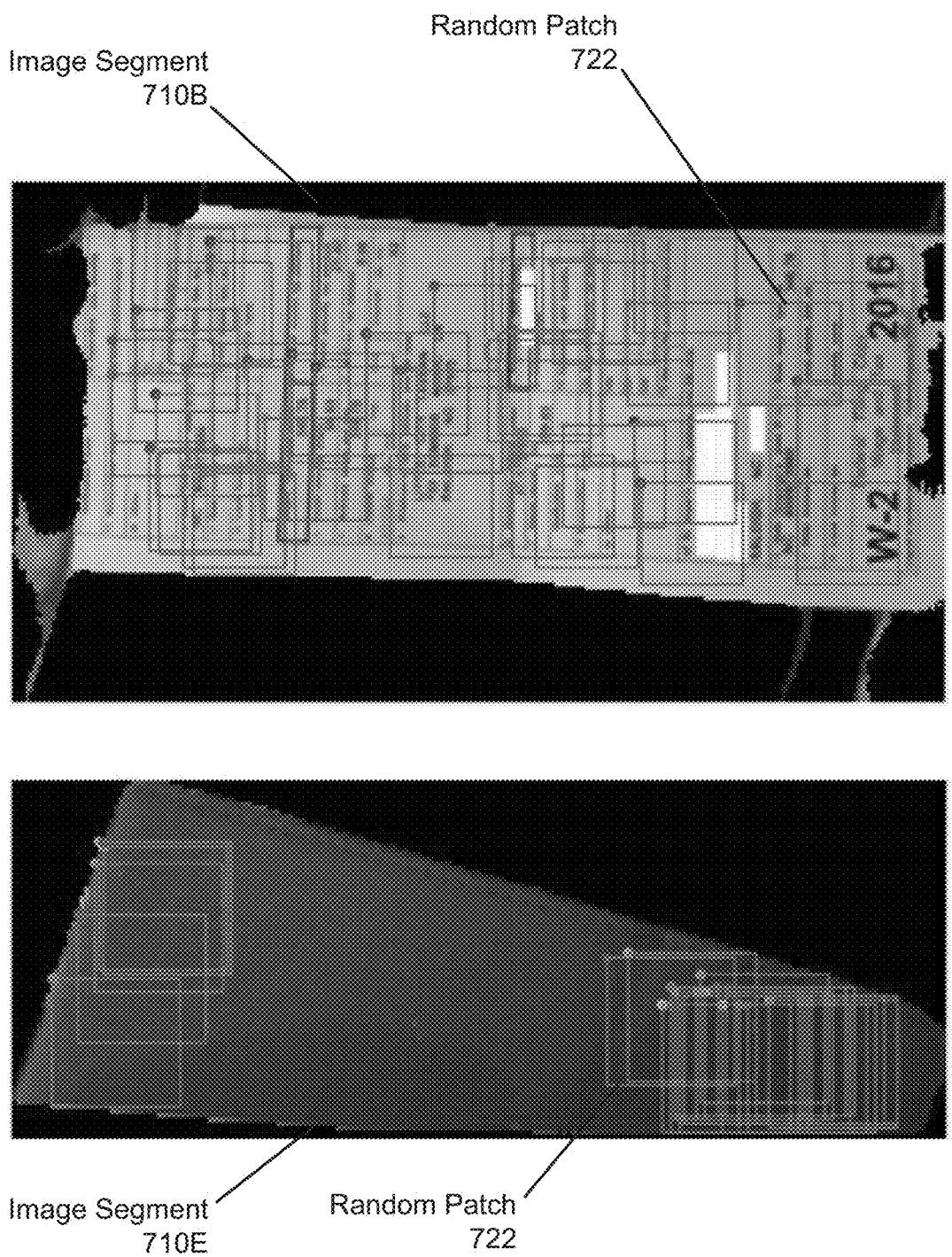

In Step 502, a random patch is selected in the image segment. The random patch corresponds to an area of the image segment that is selected for further consideration in Step 504. The random patch is selected such that it covers an area of the clustered pixels, while avoiding regions that contain zero-masked pixels. In one embodiment of the invention, the random patch has a fixed geometry and size. The random patch may be a square, and the size may be scaled based on the size of the image of the document. For example, a random patch may be 30×30 pixels for a smaller image, whereas it may be 50×50 pixels for a larger image. In FIG. 7C, the placement of many random patches (722) is illustrated for the image segments (710B and 710E). Each random patch is represented by a rectangular outline.

In Step 504, the random patch is classified as foreground or background. The classification may be performed using a classification algorithm that has previously been trained on known samples. Training samples may have been obtained, for example, from documents that are known to be in the same category as the document under consideration. For example, if the document to be processed by the methods described in FIGS. 3, 4, 5 and 6 is a tax form, the classification algorithm may have been trained on previously processed tax forms. However, the set of training samples does not necessarily have to be similar to the data analyzed as described in FIG. 5. The classification algorithm may be, for example, a binary support vector machine or any other suitable classification algorithm Various features may be considered by the classification algorithm.

In one embodiment of the invention, a considered feature is the RGB color of the pixels in the random patch. Frequently, documents include dark and bright components such as black text on a white background. Using the RGB color as a feature, the presence of such components may serve as an indication that content to be considered foreground is present. Other features may be considered to further improve classification accuracy. For example, gradients present in the random patch may serve as detectable features. Specifically, for example, text and other structures such as lines, boxes, tables, borders, edges, etc. may result in unique gradients that may be distinguishable from gradients associated with backgrounds, such as patterned or uniform backgrounds. Those skilled in the art will appreciate that alternatively or additionally other features may be considered. Any feature that is detectable based on the previously performed training of the classification algorithm may be relied upon. Such features may be provided by, for example, Gabor filters, Wavelet coefficients, histograms of oriented gradients, etc. The feature vector serving as the input to the classifier may include a combination of some or all of these features, thereby potentially boosting classification accuracy. After the classification, the random patch may be labeled as either foreground or background.

In Step 506, a determination is made about whether a sufficient number of random patches has been classified. If more random patches need to be classified, the execution of the method may return to Step 502. If a determination is made that a sufficient number of random patches has been classified, the method may proceed to Step 508. A sufficient number of random patches may have been classified if a previously specified number of random patches (e.g., 50 random patches) have been classified. Additionally, or alternatively, the required number of random patches to be classified may be adjusted based on the classification results. If significant uncertainty is remaining, e.g., because a significant number of patches indicate foreground, but a significant number of patches also indicate background, additional random patches may need to be classified. In such a situation, 100 (or even more) rather than 50 random patches may need to be classified, for example. Under certain conditions, e.g., if the non-zero-masked area available for placing random patches is very small, it may not be possible to establish the specified number of random patches. Under such conditions, the process of placing random patches may eventually be abandoned, e.g., after 50 or 100 attempts, even though only a small number of random patches have been obtained.

In Step 508, the image segment is classified based on the classification outcome of the random patches in the image segment. The classification may be performed, for example, based on a majority vote, i.e., if the majority of random patches are considered foreground, the entire image segment may be classified as foreground. Alternatively, a threshold ratio may be established, and based on the threshold ratio being exceeded, the entire image segment may be classified as foreground. For example, a threshold requirement may be that at least 30% of the random patches are classified as foreground to consider the image segment as foreground.

In Step 510, a determination is made about whether image segments to be classified are remaining. If image segments are remaining, the method may return to Step 500. If no image segments are remaining, then the method may proceed to Step 512.

Figure 8B:
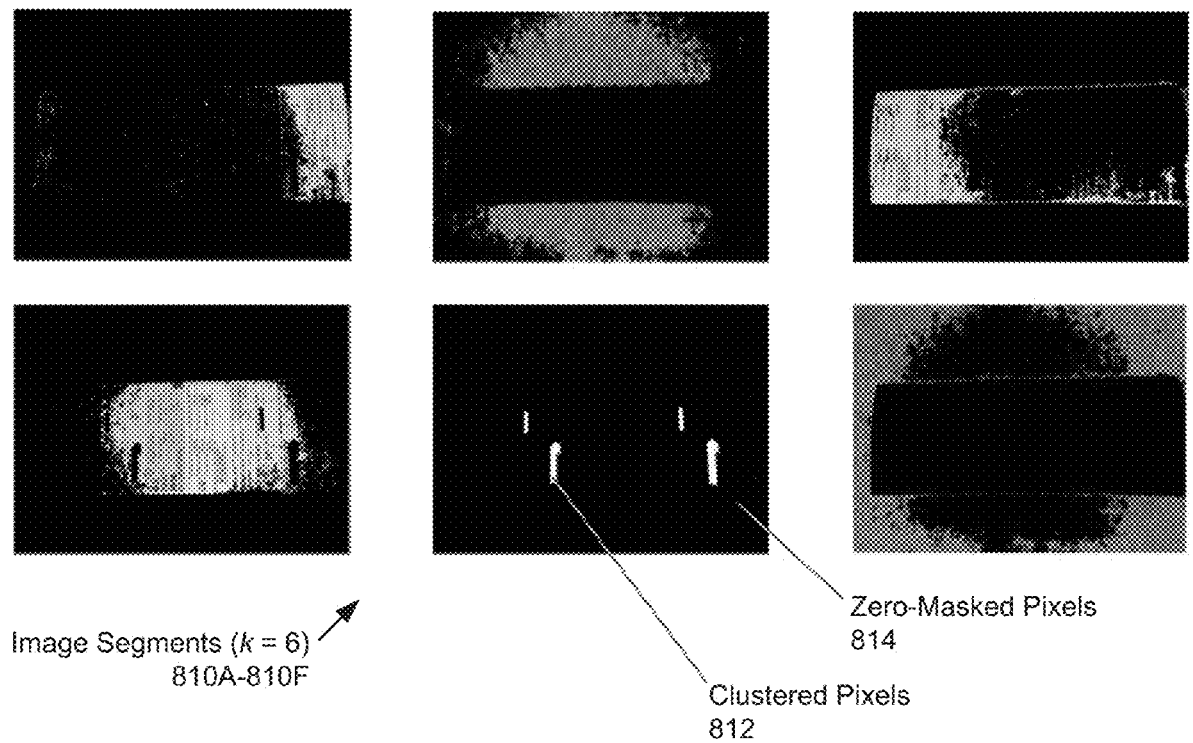

Once Step 512 is reached, all image segments have been identified as either foreground or background. In Step 512, if multiple image segments that were identified as foreground exist, these image segments may be merged to obtain an augmented image. A main foreground image segment may be the image segment with the highest likeliness of being foreground, based on the ratio of foreground to background random patches. The main foreground image may then be augmented by adding other image segments that were also determined to be foreground, with at least a likeliness above a threshold, based on the ratio of foreground to background random patches. The threshold may be specified, for example, based on a mean or median of the foreground vs background classifications for the image segments. Accordingly, even if document content was initially fragmented over multiple image segments (when executing Step 406), these fragments are recombined by the execution of Step 512. FIG. 8B shows a scenario, in which a document (shown in FIG. 8A) is fragmented over multiple image segments.

Figure 6:
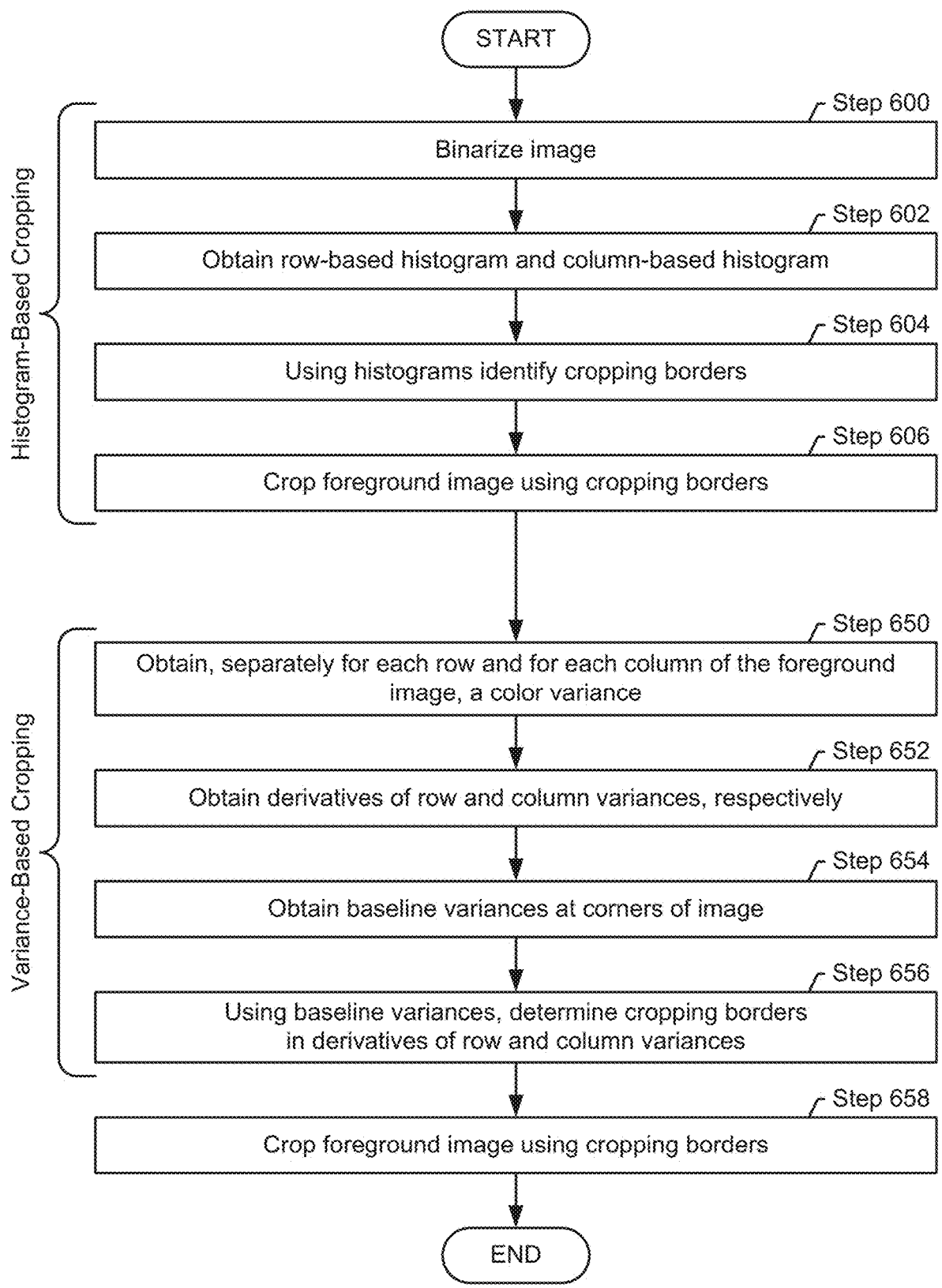

Turning to FIG. 6, a method for cropping a foreground image is described. A histogram-based cropping (Steps 600-606) and a variance-based cropping (Steps 650-658) are subsequently described. While the histogram-based cropping may be initially performed, the variance-based cropping may subsequently be performed in addition to further remove background surrounding the foreground. Examples of the operations performed in Steps 600 and 602 are provided in FIGS. 9A, 9B, 9C, 9D, 9E, 9F, 9G and 9H.

Figure 9A:
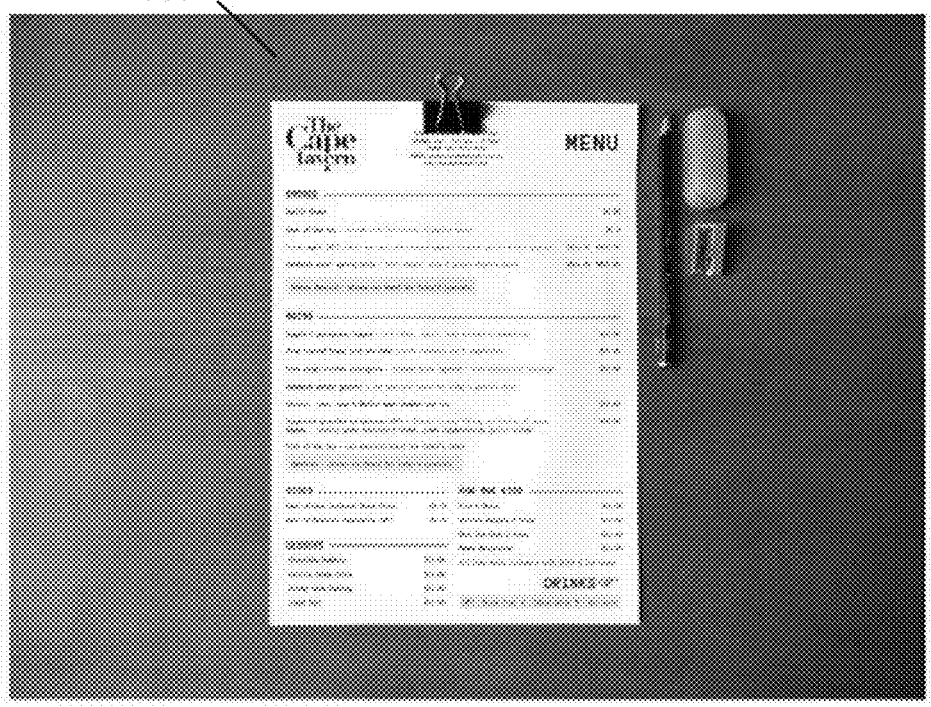
Figure 9B:
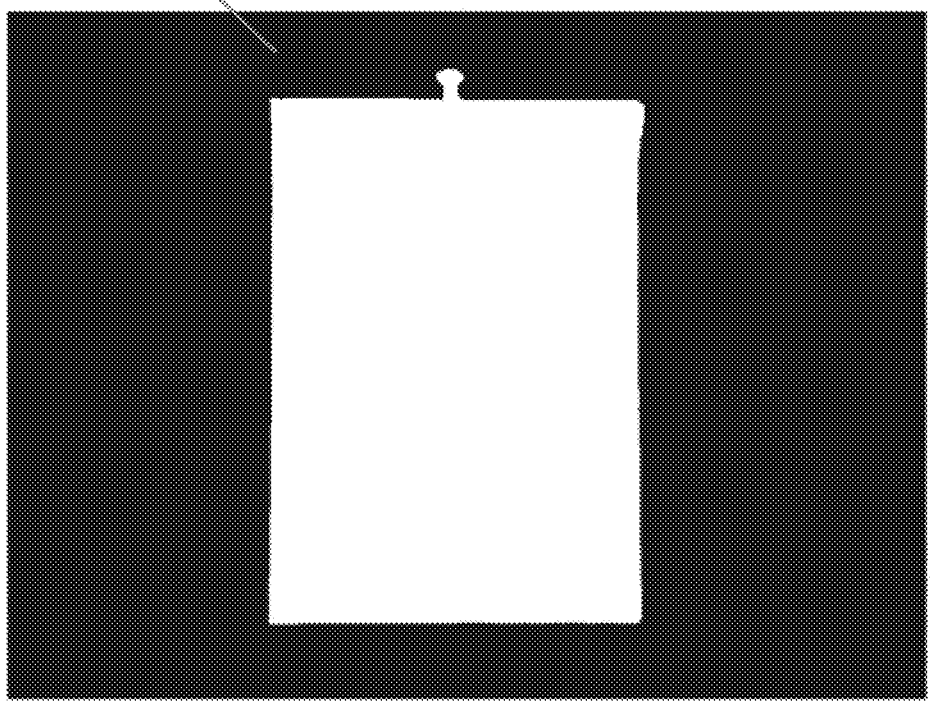

In Step 600, the image is binarized. In one embodiment of the invention, in the binarized image, each pixel of the image is classified as either foreground or background, based on the steps described in FIG. 5. FIG. 9B shows a binarized image (910A) of the original image (900A) shown in FIG. 9A. All pixels that, based on the execution of the steps described in FIG. 5 have been determined to be background are shown in black, whereas all pixels that have been determined to be foreground are shown in white.

Figure 9C:
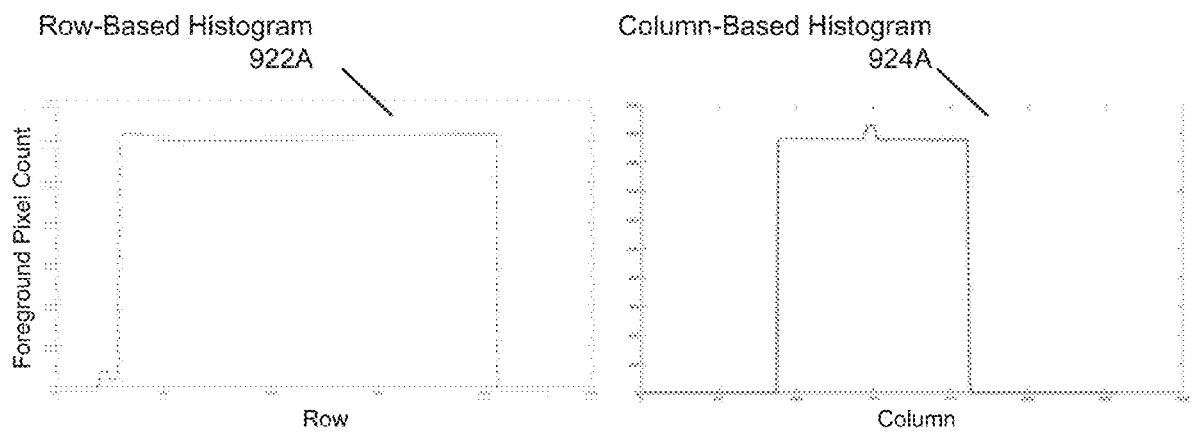
Figure 9D:
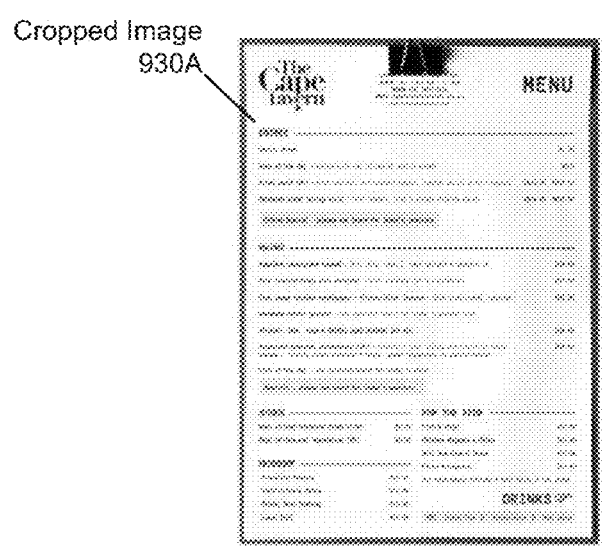
Figure 9E:
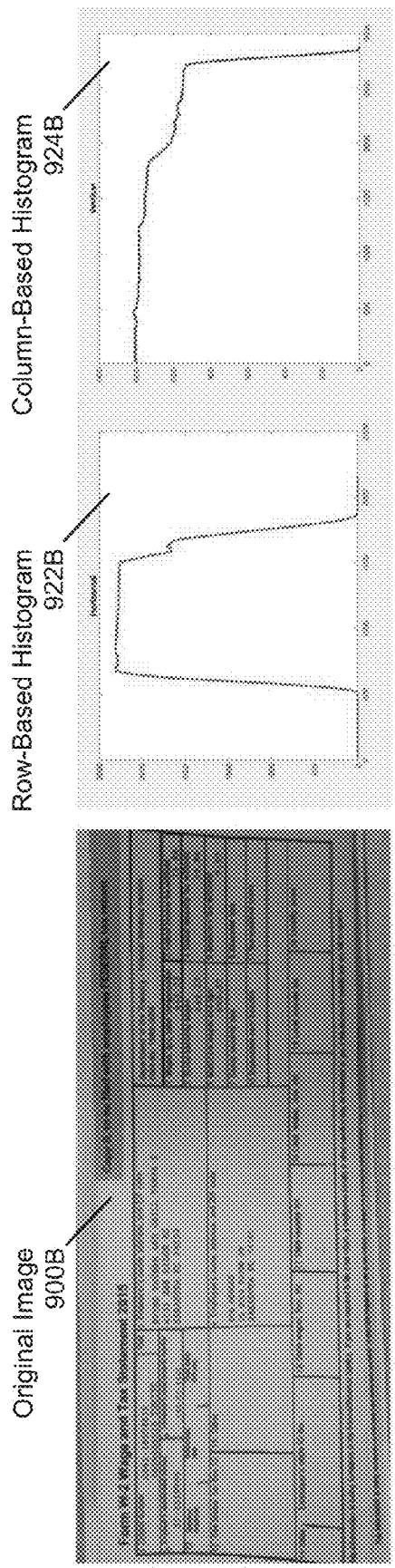
Figure 9F:
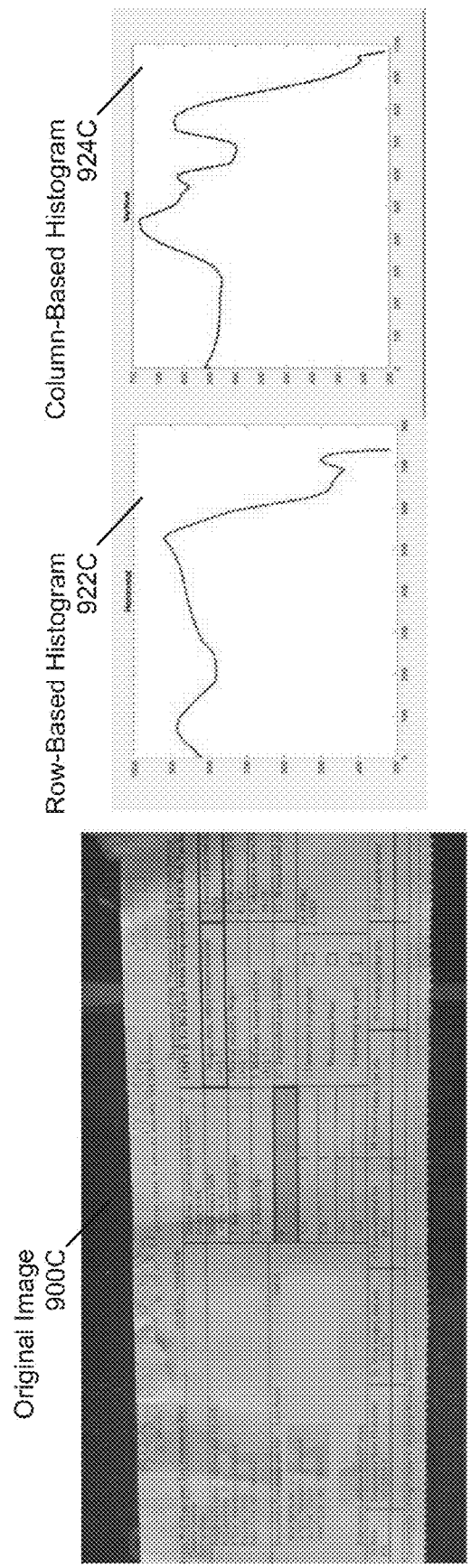
Figure 9G:
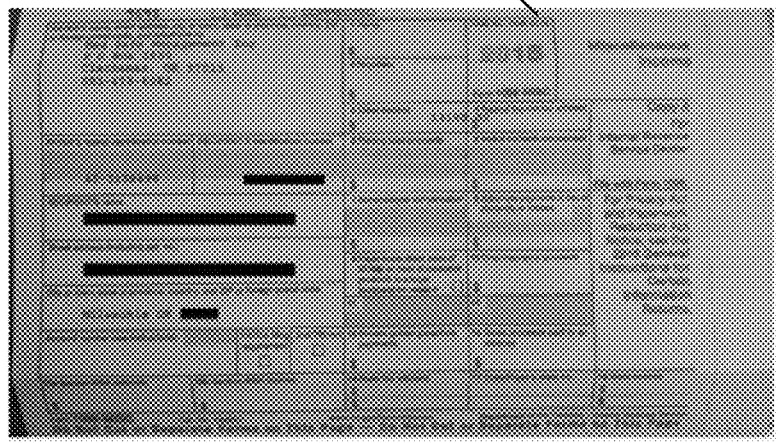

In Step 602, a row-based histogram and a column-based histogram are obtained. The row-based histogram may be obtained by counting, separately for each row of pixels in the binarized image, the pixels that are considered foreground. Similarly, the column-based histogram may be obtained by counting, separately for each column of pixels in the binarized image, the pixels that are considered foreground. Jagged histograms may be smoothened by the application of low-pass filtering. FIG. 9C shows the row-based histogram (922A) (left panel), and the column-based histogram (924A) (right panel), respectively, obtained for the binarized image (910A). FIGS. 9E and 9F provide additional examples for row-based histograms (922B, 922C) and column-based histograms (924B, 924C) obtained for exemplary images (900B, 900C).

In Step 604, the histograms are used to identify cropping borders. The cropping border may be established, for example, based on the turning or saddle points in the histograms. For example, in both the row-based histogram (922A) and the column-based histogram (924A) of FIG. 9C, foreground-containing rows and columns are readily distinguishable from rows and columns that do not contain foreground, based on the elevated foreground pixel count. Accordingly, in the example illustrated in FIG. 9C, the cropping borders may be set at the locations in the histograms, where the transition between non-foreground-containing rows/columns and foreground-containing rows/columns occurs. In one embodiment of the invention, cutoff thresholds are applied to the histograms to establish the cropping borders. Separate cutoff threshold may be set for the row-based and column-based histograms. A cutoff threshold may be obtained by determining the maximum value in the histogram. Next, a range of histogram values surrounding the maximum value in the histogram may be considered in addition to the maximum value to obtain an averaged maximum. The cutoff threshold may then be set as a fraction of the averaged maximum. For example, histogram values that are less than 50% of the averaged maximum may be considered background, thus enabling setting the cropping borders by application of the cutoff threshold in the histogram.

In Step 606, the image is cropped using the cropping borders obtained in Step 604. FIG. 9D shows the cropped image (930) resulting from applying the cropping borders.

The subsequently described steps may be performed to further reduce the background surrounding the foreground. The described variance-based cropping may allow further isolation of text from non-text, based on differences in the variance of colors between document and background. More specifically, regions with text may have a different color variance than the immediately surrounding border regions or margins without text. This difference may be detectable, and based on the detection, additional cropping may be performed as follows.

In Step 650, a color variance is obtained, separately for each row and for each column of pixels in the image obtained from the execution of Step 606. The color variance may be based on the RGB values of the pixels, or alternatively based on hue values of HSV-transformed pixels.

In Step 652, for the series of variance values for rows and columns, respectively, derivatives may be obtained. Smoothing may be applied to these derivatives of row and column variances. In one or more embodiments of the invention, the variance derivatives enable the distinction of text (foreground) from non-text (potentially remaining background) based on the following rationale. Variance is expected to change between regions with and without text. Such a change in variance shows in the variance derivatives as a peak or a trough and is, thus, detectable. The detection is performed as subsequently described.

In Step 654, the baseline variances are obtained at the corners of the image. More specifically, the mean of the variances of a few pixels may be considered to establish a baseline variance. For example, for the upper left corner of the image, the first 100 pixels of the topmost row, moving rightward, may be averaged, and the first 100 pixels of the leftmost column, moving downward, may be averaged to establish baseline row and column variances for the upper left corner. Similarly, baseline variances may be obtained for the remaining three corners of the image. The baseline variances may alternatively established from the derivatives of the variances, without departing from the invention.

Figure 9H:
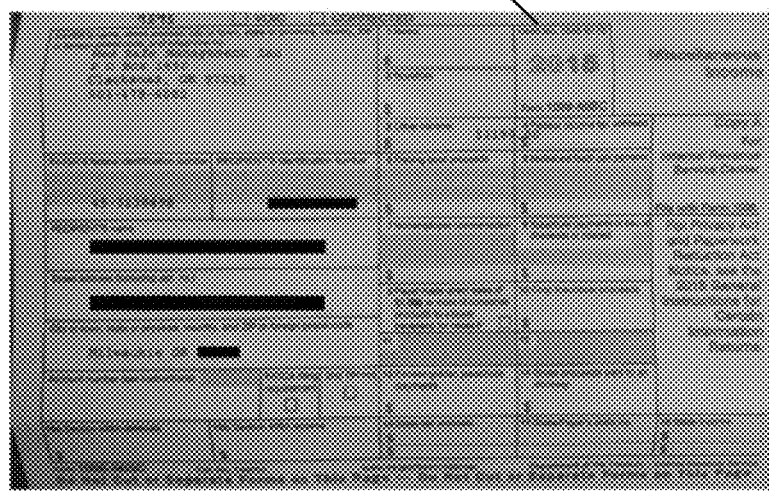

In Step 656, using the baseline variances, the derivatives of the variances are inspected for deviations from the baseline to establish cropping borders. Deviations (above or below the baseline) may indicate a change in the variance. Based on the assumption that the corners of the image (where the baseline variances were obtained) are in background regions of the image (without text), the detected deviation may suggest the beginning of a region with text. Accordingly, a cropping border may be placed to separate a text region from a non-text region. Thresholds that establish the required deviation to trigger such a detection may be specified. In Step 658, the image is cropped using the cropping borders obtained in Step 656. If no sufficiently significant deviation from baseline is detected, no cropping border is established, thus avoiding overcropping, e.g., in scenario where the text in the image reaches image regions close to the edges of the image. FIG. 9H shows such an example of an image after performing variance-based cropping (952) on the image (950) shown in FIG. 9G.

Figure 10A:
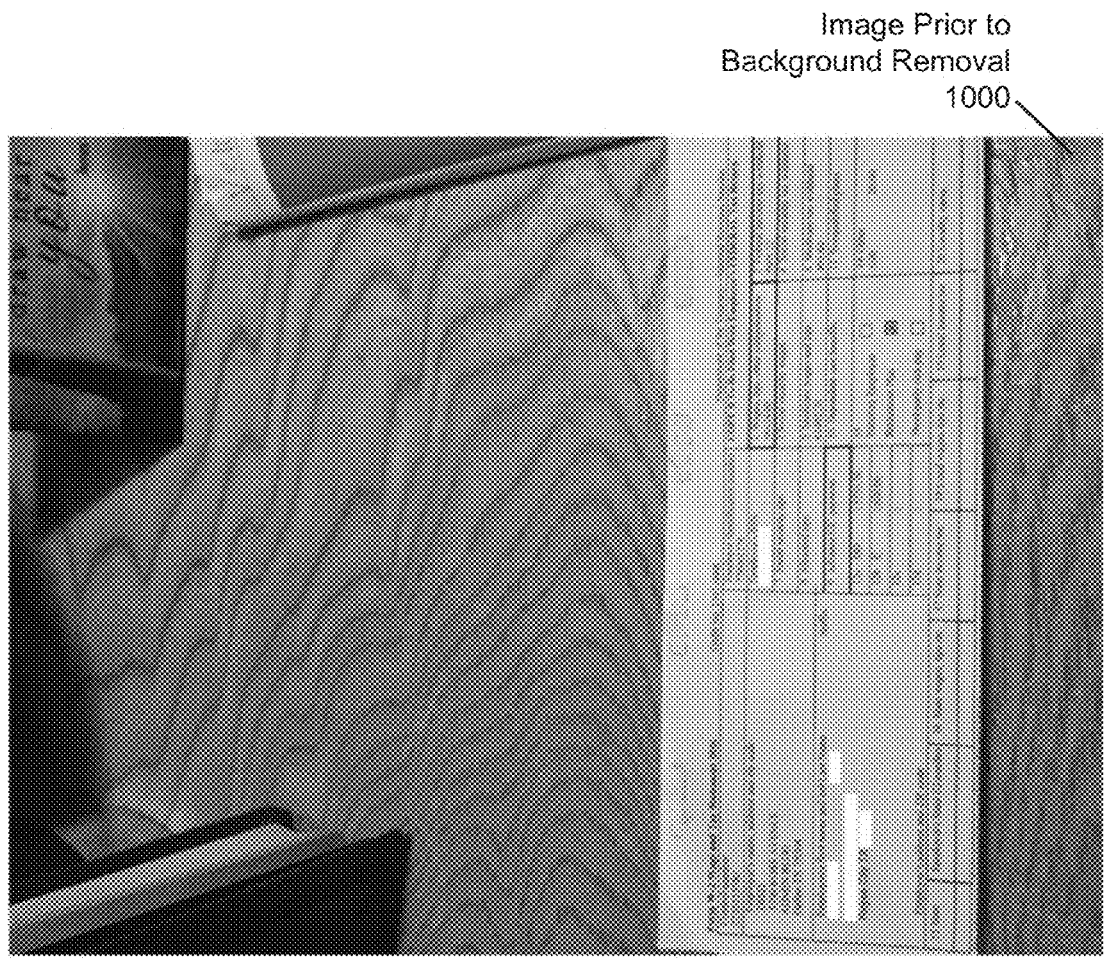
Figure 10B:
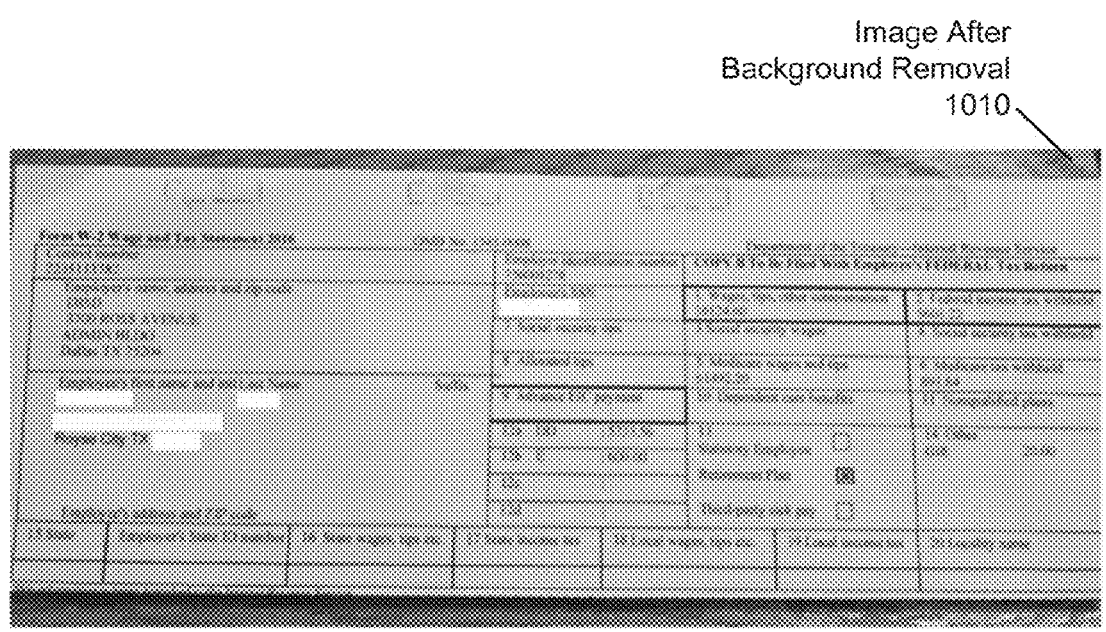

Various embodiments of the invention have one or more of the following advantages. Embodiments of the invention facilitate the processing of image-based documents by reducing or eliminating undesirable background. The resulting performance improvements are quantifiable, as subsequently discussed with reference to FIGS. 10A and 10B. FIGS. 10A and 10B show a tax form prior to and after background removal (1000, 1010), respectively. Application of a standard text extraction module to the original tax form (1000) results in poor performance with a confidence level typically at or near 0.0 (0.0 indicating no confidence, and 1.0 indicating maximum confidence). None of the content such as the terms "Control number", "Employer identification number", "Employee's SSN", etc. are correctly recognized. Application of the same standard text extraction module to the tax from after background removal (1010) results in a significantly higher performance with an overall confidence level ranging from 0.8 to 1.0. Inspection of the recognized terms indicates that the terms were correctly recognized.

Embodiments of the invention are capable of processing a diverse set of image documents and backgrounds. A few examples of successfully processed image documents are shown in FIGS. 11A-11E, with the left panels showing the original images (1100A-1100E) and the right panels showing the images after background removal (1110A-1110E). Successfully processed documents include documents with uniform and non-uniform backgrounds and combinations thereof. Embodiments of the invention successfully process backgrounds in presence of variable illumination conditions, shadows etc., and may further be capable of processing images in the presence of imperfections such as irregularly shaped documents (e.g., torn documents, wrinkled documents, etc.) Embodiments of the invention do not require geometric constraints such as particular alignments or shapes to perform a rapid and reliable foreground isolation, while avoiding over-cropping. Further, embodiments of the invention may be applied to any type of documents.

Embodiments of the invention may be implemented on a computing system. Any combination of mobile, desktop, server, router, switch, embedded device, or other types of hardware may be used. For example, as shown in FIG. 12A, the computing system (1200) may include one or more computer processors (1202), non-persistent storage (1204) (e.g., volatile memory, such as random access memory (RAM), cache memory), persistent storage (1206) (e.g., a hard disk, an optical drive such as a compact disk (CD) drive or digital versatile disk (DVD) drive, a flash memory, etc.), a communication interface (1212) (e.g., Bluetooth interface, infrared interface, network interface, optical interface, etc.), and numerous other elements and functionalities.

The computer processor(s) (1202) may be an integrated circuit for processing instructions. For example, the computer processor(s) may be one or more cores or micro-cores of a processor. The computing system (1200) may also include one or more input devices (1210), such as a touchscreen, keyboard, mouse, microphone, touchpad, electronic pen, or any other type of input device.

The communication interface (1212) may include an integrated circuit for connecting the computing system (1200) to a network (not shown) (e.g., a local area network (LAN), a wide area network (WAN) such as the Internet, mobile network, or any other type of network) and/or to another device, such as another computing device.

Further, the computing system (1200) may include one or more output devices (1208), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1202), non-persistent storage (1204), and persistent storage (1206). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (1200) in FIG. 12A may be connected to or be a part of a network. For example, as shown in FIG. 12B, the network (1220) may include multiple nodes (e.g., node X (1222), node Y (1224)). Each node may correspond to a computing system, such as the computing system shown in FIG. 12A, or a group of nodes combined may correspond to the computing system shown in FIG. 12A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (1200) may be located at a remote location and connected to the other elements over a network.

Although not shown in FIG. 12B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1222), node Y (1224)) in the network (1220) may be configured to provide services for a client device (1226). For example, the nodes may be part of a cloud computing system. The nodes may include functionality to receive requests from the client device (1226) and transmit responses to the client device (1226). The client device (1226) may be a computing system, such as the computing system shown in FIG. 12A. Further, the client device (1226) may include and/or perform all or a portion of one or more embodiments of the invention.

The computing system or group of computing systems described in FIGS. 12A and 12B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 12A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query provided to a structured data repository (where the data repository may be organized according to a database schema or data format, such as XML).

The extracted data may be used for further processing by the computing system. For example, the computing system of FIG. 12A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 12A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 12A may include functionality to provide raw and/or processed data, such as results of comparisons and other processing. For example, providing data may be accomplished through various presenting methods. Specifically, data may be provided through a user interface provided by a computing device. The user interface may include a GUI that displays information on a display device, such as a computer monitor or a touchscreen on a handheld computer device. The GUI may include various GUI widgets that organize what data is shown as well as how data is provided to a user. Furthermore, the GUI may provide data directly to the user, e.g., data provided as actual data values through text, or rendered by the computing device into a visual representation of the data, such as through visualizing a data model.

For example, a GUI may first obtain a notification from a software application requesting that a particular data object be provided within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be provided through various audio methods. In particular, data may be rendered into an audio format and provided as sound through one or more speakers operably connected to a computing device.

Data may also be provided to a user through haptic methods. For example, haptic methods may include vibrations or other physical signals generated by the computing system. For example, data may be provided to a user using a vibration generated by a handheld computer device with a predefined duration and intensity of the vibration to communicate the data.

The above description of functions presents only a few examples of functions performed by the computing system of FIG. 12A and the nodes and/or client device in FIG. 12B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for background removal from documents, comprising:
   obtaining an image of a document;
   performing a clustering operation on the image to obtain a plurality of image segments;
   performing, for each image segment, a foreground/background classification to determine whether the image segment comprises foreground,
   wherein performing the foreground/background classification comprises:
      selecting a plurality of random patches of pixels in the image segment,
      classifying each of the selected random patches as either foreground or background, and
      based on the classification of the selected random patches, classifying the image segment as either foreground or background;
   obtaining an augmented image by combining the image segments comprising foreground; and
   obtaining a background-treated image by cropping the image of the document, based on the foreground in the augmented image.

2. The method of claim 1, further comprising converting the image of the document to Lab color space, wherein the clustering operation is performed using ab channels of the Lab color space.

3. The method of claim 1,
   wherein performing the clustering operation comprises generating k image segments for k clusters, and
   wherein k represents the number of major color components identified in a color histogram of the image of the document.

4. The method of claim 1, wherein the clustering operation is performed using a K-means algorithm.

5. The method of claim 1, wherein classifying each of the selected random patches comprises applying a support vector machine configured to perform a binary classification between foreground and background.

6. The method of claim 1, wherein cropping the image of the document comprises:
   binarizing the image of the document to distinguish foreground and background pixels based on the augmented image,
   obtaining a histogram based on a number of foreground pixels in columns of the binarized image,
   identifying in the histogram, a region in which the number of foreground pixels is below a specified threshold, and
   removing the region from the image of the document to obtain the background-treated image.

7. The method of claim 6, wherein cropping the image of the document further comprises:
   obtaining, for pixels in columns of the background-treated image, color variances,
   obtaining derivatives of the color variances,
   obtaining baseline variances at corners of the background-treated image,
   determine a cropping border in the derivatives of the color variances, based on a deviation from the baseline variances, and
   crop the background-treated image by applying the cropping border to the background-treated image.

8. A system for background removal from documents, the system comprising:
   a computer processor;
   a pixel clustering engine executing on the computer processor configured to perform a clustering operation on an image of a document to obtain a plurality of image segments; and
   a foreground/background segmentation engine executing on the computer processor configured to:
      perform, for each image segment, a foreground/background classification to determine whether the image segment comprises foreground, wherein performing the foreground/background classification comprises:
         selecting a plurality of random patches of pixels in the image segment,
         classifying each of the selected random patches as either foreground or background, and
         based on the classification of the selected random patches, classifying the image segment as either foreground or background, and
      obtain an augmented image by combining the image segments that comprise foreground, and
   a cropping engine executing on the computer processor configured to:
      obtain a background-treated image by cropping the image of the document, based on the foreground in the augmented image.

9. The system of claim 8, further comprising a color space conversion engine executing on the computer processor configured to convert the image of the document to Lab color space, wherein the clustering operation is performed using ab channels of the Lab color space.

10. The system of claim 8,
    wherein performing the clustering operation comprises generating k image segments for k clusters, and
    wherein k represents the number of major color components identified in a color histogram of the image of the document.

11. The system of claim 8, wherein cropping the image of the document comprises:

binarizing the image of the document to distinguish foreground and background pixels based on the augmented image, obtaining a histogram based on a number of foreground pixels in columns of the binarized image, identifying in the histogram, a region in which the number of foreground pixels is below a specified threshold, and removing the region from the image of the document to obtain the background-treated image.

12. The system of claim 11, wherein cropping the image of the document further comprises:

obtaining, for pixels in columns of the background-treated image, color variances, obtaining derivatives of the color variances, obtaining baseline variances at corners of the background-treated image, determine a cropping border in the derivatives of the color variances, based on a deviation from the baseline variances, and crop the background-treated image by applying the cropping border to the background-treated image.

13. A method for background removal from documents, comprising:

obtaining an image of a document;

performing a clustering operation on the image to obtain a plurality of image segments;

performing, for each image segment, a foreground/background classification to determine whether the image segment comprises foreground;

obtaining an augmented image by combining the image segments comprising foreground; and obtaining a background-treated image by cropping the image of the document, based on the foreground in the augmented image, wherein cropping the image of the document comprises:

obtaining, for pixels in columns of the background-treated image, color variances, obtaining derivatives of the color variances, obtaining baseline variances at corners of the background-treated image, determine a cropping border in the derivatives of the color variances, based on a deviation from the baseline variances, and crop the background-treated image by applying the cropping border to the background-treated image.

14. The method of claim 13, further comprising converting the image of the document to Lab color space, wherein the clustering operation is performed using ab channels of the Lab color space.

15. The method of claim 13, wherein performing the clustering operation comprises generating k image segments for k clusters, and wherein k represents the number of major color components identified in a color histogram of the image of the document.

16. The method of claim 13, wherein cropping the image of the document further comprises:

binarizing the image of the document to distinguish foreground and background pixels based on the augmented image, obtaining a histogram based on a number of foreground pixels in columns of the binarized image, identifying in the histogram, a region in which the number of foreground pixels is below a specified threshold, and removing the region from the image of the document to obtain the background-treated image.

17. A system for background removal from documents, the system comprising:

a computer processor;

a pixel clustering engine executing on the computer processor configured to perform a clustering operation on an image of a document to obtain a plurality of image segments; and a foreground/background segmentation engine executing on the computer processor configured to:

perform, for each image segment, a foreground/background classification to determine whether the image segment comprises foreground, and obtain an augmented image by combining the image segments that comprise foreground, and a cropping engine executing on the computer processor configured to:

obtain a background-treated image by cropping the image of the document, based on the foreground in the augmented image, wherein cropping the image of the document further comprises:

obtaining, for pixels in columns of the background-treated image, color variances, obtaining derivatives of the color variances, obtaining baseline variances at corners of the background-treated image, determine a cropping border in the derivatives of the color variances, based on a deviation from the baseline variances, and crop the background-treated image by applying the cropping border to the background-treated image.

18. The system of claim 17, further comprising a color space conversion engine executing on the computer processor configured to convert the image of the document to Lab color space, wherein the clustering operation is performed using ab channels of the Lab color space.

19. The system of claim 17, wherein performing the clustering operation comprises generating k image segments for k clusters, and wherein k represents the number of major color components identified in a color histogram of the image of the document.

20. The system of claim 17, wherein cropping the image of the document further comprises:

binarizing the image of the document to distinguish foreground and background pixels based on the augmented image, obtaining a histogram based on a number of foreground pixels in columns of the binarized image, identifying in the histogram, a region in which the number of foreground pixels is below a specified threshold, and removing the region from the image of the document to obtain the background-treated image.

* * * * *